United States Patent Office 3,666,559
Patented May 30, 1972

3,666,559
SURFACE TREATMENT OF GLASS-CERAMICS
Joseph J. Domicone, Horseheads, N.Y., assignor to Corning Glass Works, Corning, N.Y.
No Drawing. Filed July 2, 1970, Ser. No. 52,117
Int. Cl. C23g 1/02
U.S. Cl. 134—3
6 Claims

ABSTRACT OF THE DISCLOSURE

A method of removing metal marks from the surface of a glass-ceramic material by treating the material with an aqueous solution of gluconic acid at elevated temperatures.

---

Tableware and cookware have in recent years been made from a unique heat resistant material known as glass ceramics. These are materials which initially have been melted and fabricated as glasses and then have been converted to a predominantly crystalline state by special treatments. Generally, the process comprises melting a glass forming batch into which has been introduced a nucleating or crystallization promoting agent, simultaneously shaping and cooling the melt into a glass body, and thereafter heating the body following a specific heating schedule. In this way, the glass is converted into a body composed of fine-grained randomly-oriented crystals dispersed substantially uniformly in a glass matrix and comprising a major portion of the mass of the body. Such a process is described by S. D. Stookey in U.S. Pat. No. 2,920,971. The physical properties of the glass-ceramics are somewhat closer to those of conventional ceramics than they are to the original glass. Heat resistant glass ceramic materials have been sold commercially under the trademarks Centura and Corning Ware.

A glass-ceramic cookware in addition to its good appearance, also has the advantage in that it can be used for cooking, serving, and storing food in a refrigerator and then cooking the food again without being subjected to breakage due to thermal shock. The glass-ceramic tableware has excellent thermal properties and is especially resistant to mechanical shock. However, after a period of use there are minor disadvantages which appear in some of the articles made from these materials. For example, metal marks sometimes appear on the surface of the ware which arise from contact with metal flatware or are due to the metal racks in automatic dishwashers. The problem arises because the glass-ceramic materials are much harder than most flatware and tend to grind metal onto their surface.

In accordance with the present invention, I have discovered a method of removing metal marks from glass-ceramic materials by treating the materials having metal marks with an aqueous solution with gluconic acid at elevated temperatures for a time sufficient to remove the marks. Thereafter the treating solution is removed by thoroughly washing the materials with water.

As an illustration, a specific method of making a glass-ceramic material used in tableware is set forth in R. O. Voss, U.S. Pat. 2,960,802. This method comprises heat treating a glass body consisting essentially of about 71% $SiO_2$, 2.5% $Li_2O$, 18% $Al_2O_3$, 4.5% $TiO_2$, 3% MgO and 1% ZnO, plus minor constituents as explained below, by heating it at a rate of not over 5° C. per minute to about 800° C., holding it at about 800° C. for about 1 hour, further heating it at a rate not over 5° C. per minute to 1080° C.–1120° C. and holding it in such temperature range for about 4 hours. Preferably, the body is held for about 2 hours at about 1080° C. and for about 2 hours at about 1120° C.

The above-mentioned composition is melted in a continuous tank furnace at about 1600° C. In order to maintain oxidizing conditions in the tank during melting, small amounts of $NaNO_3$ and $As_2O_5$ are included in the batch as oxidizing agents, the $As_2O_5$ also functioning as a fining agent. Other conventional oxidizing and fining agents can be substituted, if desired. The residual $Na_2O$ and $As_2O_3$ remaining in the glass amount to about ⅕ of the total composition and have no appreciable effect on the properties of either the glass or its semicrystalline product.

The glass-ceramic material sold under the trademark Corning Ware is nonglazed. When stainless steel or silver flatware come in contact with it, metal markings have been found to occur. The glass ceramic material is much harder than most flatware and tends to grind metal onto its surface much the same as a wet or oil stone does. The standard iron test using 50% HCl plus potassium thiocyanate results in a light pink color which indicates the gray or black marks were metal on the surface. Glazed glass-ceramic material is sold under the trademark Centura. The thin glaze protects the tableware for a period of time against metal marks, but after the flatware has passed through the glaze and makes contact with the glass-ceramic material metal marks occur. The latter are much harder to remove and require a longer treatment time.

Gluconic acid may be represented by the formula $C_6H_{12}O_7$. It is produced commercially by the fermentative oxidation of the aldehyde group in glucose from corn using Aspergillus niger. The acid is freely soluble in water, slightly soluble in alcohol, insoluble in ether and most other organic solvents. Because of the difficulties of preparing a solid crystalline product, gluconic acid is available as a 50% aqueous solution. For the purposes of this invention, the treating solution should contain 1–50% by weight of gluconic acid in an aqueous solution. The pH of the solution varies from about pH 2.2 (50% solution) to pH 3.2 (1% solution). The preferred coating solution contains about 6–10% by weight of gluconic acid. The temperature of the treating solution is preferably 50–100° C.

As an illustrative example, platters made from Corning Code 9608 glass-ceramic were used commercially and developed numerous gray and black metal marks. The platters were placed in a 10% by weight aqueous solution of gluconic acid at a temperature of 90° C. After 10 minutes the platters were removed from the solution and rinsed in a standard dishwasher. It was observed that substantially all the metal marks had been removed. Similar results were obtained using Centura plates which were placed in the treating solution for a period of 10–15 minutes and washed. Almost all (95%) of the marks were removed.

I claim:
1. A method of removing marks containing iron and/or silver metal from the surface of glass-ceramic material comprising treating the surface of the material having said marks with a 1–50% by weight aqueous solution of gluconic acid at temperatures between about 50°–100° C. for a time sufficient to substantially remove said marks, and theerafter washing said material with water.

2. The method of claim 1 wherein the solution contains about 6–10% by weight of gluconic acid.

3. The method of claim 1 wherein the time is about 5–15 minutes.

4. The method of claim 1 wherein said glass-ceramic material consists essentially as calculated from the batch on the oxide basis of:

| Ingredient: | Percent by weight |
|---|---|
| $SiO_2$ | 71 |
| $LiO_2$ | 2.5 |
| $Al_2O_3$ | 18 |
| $TiO_2$ | 4.5 |
| MgO | 3.0 |
| ZnO | 1.0 | said glass-ceramic materal being predominantly crystalline.

5. The method of claim 1 wherein said glass-ceramic material is unglazed.

6. The method of claim 1 wherein said glass-ceramic material is glazed.

References Cited

UNITED STATES PATENTS

| 3,211,659 | 10/1965 | Pikaar | 252—142 |
| 3,218,260 | 11/1965 | Lewandowski | 252—142 |
| 3,454,501 | 7/1969 | Ziffer et al. | 252—142 |

OTHER REFERENCES

Prescott et al.: Gluconic Acid and its' Derivatives, Ind. and Eng. Chemistry, vol. 45, 2, pages 338–342.

HERBERT B. GUYNN, Primary Examiner

W. SCHULZ, Assistant Examiner

U.S. Cl. X.R.

252—142, DIG 10